United States Patent
Woo

(10) Patent No.: US 8,947,980 B2
(45) Date of Patent: Feb. 3, 2015

(54) MICRO-GEOPHONE

(75) Inventor: Daniel M. Woo, Missouri City, TX (US)

(73) Assignee: Geospace Technologies, LP, Houston, TX (US)

( * ) Notice: Subject to any disclaimer, the term of this patent is extended or adjusted under 35 U.S.C. 154(b) by 277 days.

(21) Appl. No.: 13/553,597

(22) Filed: Jul. 19, 2012

(65) Prior Publication Data

US 2014/0022867 A1   Jan. 23, 2014

(51) Int. Cl.
*H04R 9/00* (2006.01)
*G01V 1/38* (2006.01)
*G01V 1/18* (2006.01)
*H04R 9/04* (2006.01)

(52) U.S. Cl.
CPC . *G01V 1/183* (2013.01); *H04R 9/04* (2013.01)
USPC .......................................... 367/182; 156/293

(58) Field of Classification Search
USPC .......................................................... 367/182
See application file for complete search history.

(56) References Cited

U.S. PATENT DOCUMENTS

| | | | |
|---|---|---|---|
| 2,930,911 A * | 3/1960 | Youell et al. ..................... 310/26 |
| 3,217,979 A | 11/1965 | Long et al. | |
| 3,299,397 A | 1/1967 | Pavey, Jr. et al. | |
| 3,738,445 A | 6/1973 | Wilson et al. | |
| 4,159,464 A * | 6/1979 | Hall, Jr. ......................... 367/182 |
| 4,215,296 A * | 7/1980 | Mitamura et al. ............. 315/408 |
| 4,469,303 A | 9/1984 | Snyder | |
| 5,469,408 A * | 11/1995 | Woo ............................... 367/182 |
| 6,922,374 B2 * | 7/2005 | Hagedoorn et al. ........... 367/182 |
| 7,518,954 B2 | 4/2009 | Haggedoorn | |
| 8,098,546 B2 | 1/2012 | Woo | |
| 2003/0179103 A1* | 9/2003 | Kamata .................... 340/870.16 |

OTHER PUBLICATIONS

International Search Report of corresponding counterpart international application No. PCT/US2013/051335 dated Oct. 8, 2013.

* cited by examiner

*Primary Examiner* — Mark Hellner
*Assistant Examiner* — James Hulka
(74) *Attorney, Agent, or Firm* — Gary L. Bush; Andrews Kurth LLP

(57) ABSTRACT

A micro geophone having pole pieces do not extend out around the sides of the magnet, thereby allowing a reduced geophone diameter for a given magnet diameter. The pole pieces are adhesively bonded to the magnet using an adhesive, which may be made suitably electrically conductive by silver or nickel fillers or non-conductive by mica fillers such as borosilicate glass micro-spheres. Axial space is economized by eliminating traditional spider retaining rings. The spider springs are seated directly against the coil form and secured by adhesive fillets disposed on the outward-facing spring circumferences. The spider springs include circumferential notches to receive adhesive. A two-piece bimetallic coil form of aluminum and a heavier material, joined by adhesive, is provided. Headers are affixed to the housing within the seats by adhesive. A straight or rounded chamfer at each of the geophone ends allows the overall geophone dimensions to be maximized.

8 Claims, 7 Drawing Sheets

MICRO-GEOPHONE

BACKGROUND OF THE INVENTION

1. Field of the Invention

This invention relates generally to geophones used in seismic exploration.

2. Description of the Prior Art

FIG. 1 shows a vertical geophone (10) of conventional design. FIG. 1 is a cross section taken along the longitudinal axis of the geophone (10). The geophone (10) employs a cylindrical magnet (14), cylindrical upper and lower ferrous pole pieces (16, 18), and a tubular ferrous outer housing (20), which together form a magnetic circuit.

The upper and lower pole pieces (16, 18) each have a cap-like shape so that they fit over and receive the upper and lower ends of the magnet (14), respectively. The tubular portion of the upper and lower pole pieces that enclose the sides of the cylindrical magnet (14) are referred to herein as pole piece lips (80, 82). The magnet (14) and pole pieces (16, 18) are received within the outer cylindrical housing (20). In addition to shaping magnetic flux across the air gaps (22, 24), as described below, the circular lips (80, 82) function to keep the magnet (14) precisely coaxially aligned between the pole pieces (16, 18).

The lower pole piece (18) and the outer housing (20) are connected to a lower end cap (26), which is in turn connected to the earth, such as by a stake (not shown) that is placed within the ground, so as to transmit seismic vibrations to the magnet and pole pieces. The lower end cap (26) is typically formed of an electrically non-conductive plastic material. An upper end cap (28) is connected between the upper pole piece (16) and the upper end of the outer housing (20). The upper end cap (28) is also typically made of a dielectric plastic material. The upper and lower end caps (28, 26), also referred to as headers, are held within the cylindrical housing (20) by crimping or swaging the upper and lower perimeters of the housing (20) about the end caps.

The bottom end of the lower pole piece (18) includes a centered circular recess (84) that mates with a centered circular protrusion (85) formed on the upper side of the lower end cap (26), thereby precisely coaxially aligning the lower pole piece (18) with the lower end cap (26). As an equivalent alternative (not illustrated), the lower pole piece (18) may have a circular protrusion that is received into a circular recess formed in the lower end cap (26). A similar arrangement of a circular recess (86) and a circular protrusion (87) keeps the upper pole piece (16) coaxially aligned with the upper end cap (28).

Within the annular space between the magnet (14) and pole pieces (16, 18) on the one hand, and the housing (20) on the other, an inertial member, typically a cylindrical coil form (30), is suspended between an upper frequency-tuned spring (32) and a lower frequency-tuned spring (34). The frequency-tuned springs (32, 34) allow the magnet (14), pole pieces (16, 18), and outer housing (20) to vibrate up and down coaxially with respect to the coil form (30) while the coil form (30) remains essentially motionless and decoupled from the rest of the geophone (10). The frequency-tuned springs (32, 34) are designed and tuned to provide a desired resonant frequency.

The upper and lower frequency-tuned springs (32, 34), also known as spider springs, are typically washer-shaped. The inner circumferences of the frequency-tuned springs (32, 34) are sandwiched between their respective end caps (28, 26) and pole pieces (16, 18). The outer circumferences of the frequency-tuned springs (32, 34) are connected to the upper and lower ends of the coil form (30) as described in greater detail below with respect to FIG. 2. The upper and lower frequency-tuned springs (32, 34) fit precisely about the upper and lower circular inward-facing protrusions (87, 85) of the upper and lower end caps (28, 26), respectively, thereby coaxially centering the coil form (30).

FIG. 2 is an enlarged view of the upper frequency-tuned spring/coil form interface as indicated in FIG. 1. Referring to FIG. 2, the upper end of the coil form (30) forms an interior circumferential groove (36) and an upward-facing ledge (37). The outer circumferences of the upper frequency-tuned spring (32) is disposed within the interior circumferential groove (36) and seated on the upward-facing ledge (37). A C-ring, C-clip, or like clamp (38) is then compressed and inserted into the groove (36). The C-ring clamp (38) continually exerts a radial force against the coil form (30), which prevents it from coming out of the groove (36) thereby securing the upper frequency-tuned spring (32) to the upper end of the coil form (30). A similar arrangement secures the outer circumference of the lower frequency-tuned spring (34) to the lower end of the coil form (30).

FIG. 3 is an enlarged side view cross-section of a prior art geophone that illustrates an alternate arrangement for mounting the frequency-tuned springs to the coil form according to U.S. Pat. No. 3,738,445, issued to Wilson et al. and entitled "Seismometer Spring Suspension System." An upper frequency spring (32') that includes openings (33) formed therethrough about its circumference is illustrated. The upper frequency spring (32') is mounted to the upward-facing ledge (37') of the coil form (30') by a thin layer of adhesive (91). The adhesive is also disposed through the openings (33), and once cured forms solid columns of adhesive (93). Because the coil form (30') has no recess into which the upper frequency spring (32') is received, the upper frequency spring (32') is not self-centering with respect to the coil form (30'). The layer of adhesive (91) between the coil form ledge (37) and the upper frequency spring (32') may affect the resonance of the spring. Moreover, before it adhesive cures, the adhesive (91) may drip on to the inside and outside walls of the coil form (30'), which may be difficult to clean.

Referring back to FIG. 1, the geophone (10) forms a magnetic circuit with upper and lower annular air gaps (22, 24) that are defined in the regions between the upper and lower pole pieces (16, 18), respectively, and the housing (20). A magnetic flux is created by and passes axially through the magnet (14). From the upper end of the magnet (14), the magnetic flux is channeled and redirected through the upper pole piece (16) so as to pass radially across the upper annular air gap (22) to the housing (20). The flux passes vertically downward through the cylindrical housing (20) and radially inward to the lower pole piece (18) through the lower air gap (24). The lower pole piece channels and redirects the flux to the lower end of the magnet (14) to complete the magnetic circuit.

Upper and lower electrical coils (40, 42) are wound about the coil form (30) so as to be located in the upper and lower air gaps (22, 24), respectively. The winding direction of the upper coil (40) is opposite of the winding direction of the lower coil (42), and the coils are electrically connected together in series.

An electrical circuit is formed as follows: The upper lead (not visible) of the upper coil (40) is electrically connected to the outer circumference of the upper frequency-tuned spring (32) by a solder joint, for example. The inner circumference of the upper frequency-tuned spring (32) makes sliding electrical contact with an outer wiper ring assembly (61), which includes a lead (60) that passes through the upper end cap (28). The inner circumference of the upper frequency-tuned spring (32) is separated and electrically isolated from the upper pole piece (16) by a thin dielectric washer (52) that is positioned therebetween. The lower lead (not illustrated) of the upper coil (40) is connected to the upper lead (not illustrated) of the lower coil (42).

The lower lead (not visible) of the lower coil (42) is connected to the outer circumference of the lower frequency-tuned spring (34) by solder joint, for example. The inner circumference of the lower frequency-tuned spring (34) makes sliding electrical contact with the lower surface of the lower pole piece (18). An electrical connection is formed between the lower pole piece (18) and the upper pole piece (16) through abutting contact of the upper and the lower pole pieces with the magnet (14). Finally, the upper pole piece (16) makes sliding electrical contact with an inner wiper surface (63), which includes a lead (64) that passes through the upper end cap (28).

The first and second leads (60, 64) are connected to geophone recording circuitry through a seismic cable (not illustrated). The arrangement of this electrical circuit allows the coil form (30) to freely rotate about its vertical axis within the geophone (10), thus minimizing the possibility of damage from rough handling.

In operation, a terrestrial vibration causes the magnetic circuit components, and hence the magnetic flux, to vibrate up and down relative to the coil form (30), which remains essentially stationary due to its inertia. As the radial flux lines cut the upper and lower coils (40, 42), changes in flux density induce an electromotive force in the coils according to Faraday's law. This induced voltage is measured at the first and second leads (60, 64) via the electrical circuit described above.

Damping of the coil form (30) is necessary so that there will not be continual oscillation of the coil form (30) relative to the rest of the geophone (10), but too much damping reduces geophone sensitivity. Damping of the coil form (30) is a function of both the mass and the electrical conductivity of the coil form (30). The conductivity affects the formation of eddy currents in the coil form (30) created by Faraday induction. The coil form eddy currents flowing in a magnetic field result in a force being exerted on the coil form (30) that opposes the motion that created the eddy currents. Conductivity of the prior art coil form (30) is controlled by using a two-part coil form assembly. The coil form (30) includes an upper bobbin sleeve (70) that is received into a lower bobbin sleeve (72) (or vice versa). The upper and lower bobbin sleeves (70, 72) are formed of anodized aluminum and are joined by adhesive. The anodization layer electrically insulates the bobbin halves, thereby reducing the formation of eddy currents in the assembled two-piece coil form (30) as compared to a one-piece coil form of identical dimensions.

In conducting a seismic survey, multiple geophone channels are recorded. As computing power increases, it has become more desirable to conduct high resolution surveys across large geographical areas, which necessitates that large number of geophone channels are employed in a given survey. Therefore, it is desirable to reduce the geophone size, thus decreasing the overall capital and operational cost of the survey system. For example, when geophones are used in marine streamers, smaller geophone size allows streamer diameter to be reduced, which in turn allows longer streamers to be employed with greater members of geophones per cable.

The process of miniaturizing a geophone of prior art, such as the geophone (10) of FIG. 1, is not merely an exercise in scaling, because as the size of the magnet is reduced, the ability to output a voltage signal that is detectable above the ambient noise level is diminished. Accordingly, it is desirable to decrease geophone dimensions while at the same time maximizing the magnet size.

The process of miniaturizing a geophone also inherently alters the natural frequency response of a geophone. Substantial reductions in geophone size while providing an acceptable frequency response have heretofore not been possible.

Additionally, limitations in manufacturing processes and materials have also been a factor in heretofore preventing the design of a micro-geophone that can be manufactured with a commercially reasonable cost.

3. Identification of Objects of the Invention

A primary object of the invention is to provide a significantly miniaturized geophone having the sensitivity and frequency response of the much larger traditional geophones.

Another object of the invention is to provide a method and apparatus for precisely controlling geophone damping by tightly controlling the overall mass of a geophone coil/coil form assembly.

Another object of the invention is to provide a miniaturized geophone characterized by a frequency response tuned for frequencies of 30 Hertz or lower.

SUMMARY OF THE INVENTION

The objects described above and other advantages and features of the invention are incorporated, in a preferred embodiment, in a micro-geophone having a cylindrical magnet, cylindrical lipless upper and lower pole ferrous pole pieces, and a tubular ferrous outer housing. Coils wound on an a cylindrical inertial coil form are suspended within the housing about the magnet and pole pieces by upper and lower spider springs.

The pole pieces do not extend out around the side of the magnet, thereby allowing a reduced geophone diameter for a given magnet diameter. The pole pieces are preferably adhesively bonded to the north and south poles of the magnet using an adhesive epoxy, which may be made suitably electrically conductive by the addition of silver or nickel fillers, for example, or suitably electrically non-conductive by the addition of mica fillers such as borosilicate glass micro-spheres, for example.

In addition to economizing radial space by eliminating pole piece lips, according to one or more embodiments of the invention, axial space is also economized by a novel coil form mounting arrangement, in which traditional spider spring retaining rings are eliminated. The frequency-tuned springs are instead seated directly against respective shoulders of the coil form and held in place by thermoset adhesive fillets disposed on the outward-facing surfaces of the springs along their circumferences.

In a preferred embodiment, the frequency-tuned springs ideally include a number of notches, cut-outs or indentations intervaled about their outer circumferences, which allow uncured adhesive to flow and collect therein. Once cured, strong, hard and rigid epoxy columns ensure a robust mechanical connection of the springs to the coil form.

According to a preferred embodiment, the micro-geophone also employs a two-piece bimetallic coil form, in which a first bobbin sleeve is formed of a lighter material such as anodized aluminum and a second bobbin sleeve is formed of a heavier material, such as brass, bronze, or copper, for example. The anodization electrically insulates the aluminum bobbin sleeve, for suppression of eddy currents, while the use of brass, bronze, or copper, for the second bobbin sleeve raises the overall mass of the coil form to lower frequency response without becoming too heavy so as to over damp. The upper and lower bobbin sleeves are joined by adhesive.

Another feature of the micro-geophone according to one or more embodiments of the invention is a unique arrangement that provides for maximizing geophone length and/or outer diameter dimensions when the geophone is located within a streamer cable perpendicular to the streamer cable axis. A seat is formed around the interior circumference of the geophone housing at each of the top and bottom ends. The upper and lower end caps are affixed to the housing within the seats by use of an adhesive bonding agent. A straight or rounded chamfer at each of the geophone ends allows the overall geophone dimensions to be maximized for a given streamer inner diameter.

BRIEF DESCRIPTION OF THE DRAWINGS

The invention is described in detail hereinafter on the basis of the embodiments represented in the accompanying figures, in which.

DESCRIPTION OF THE PREFERRED

Embodiment of the Invention

Figure 1:
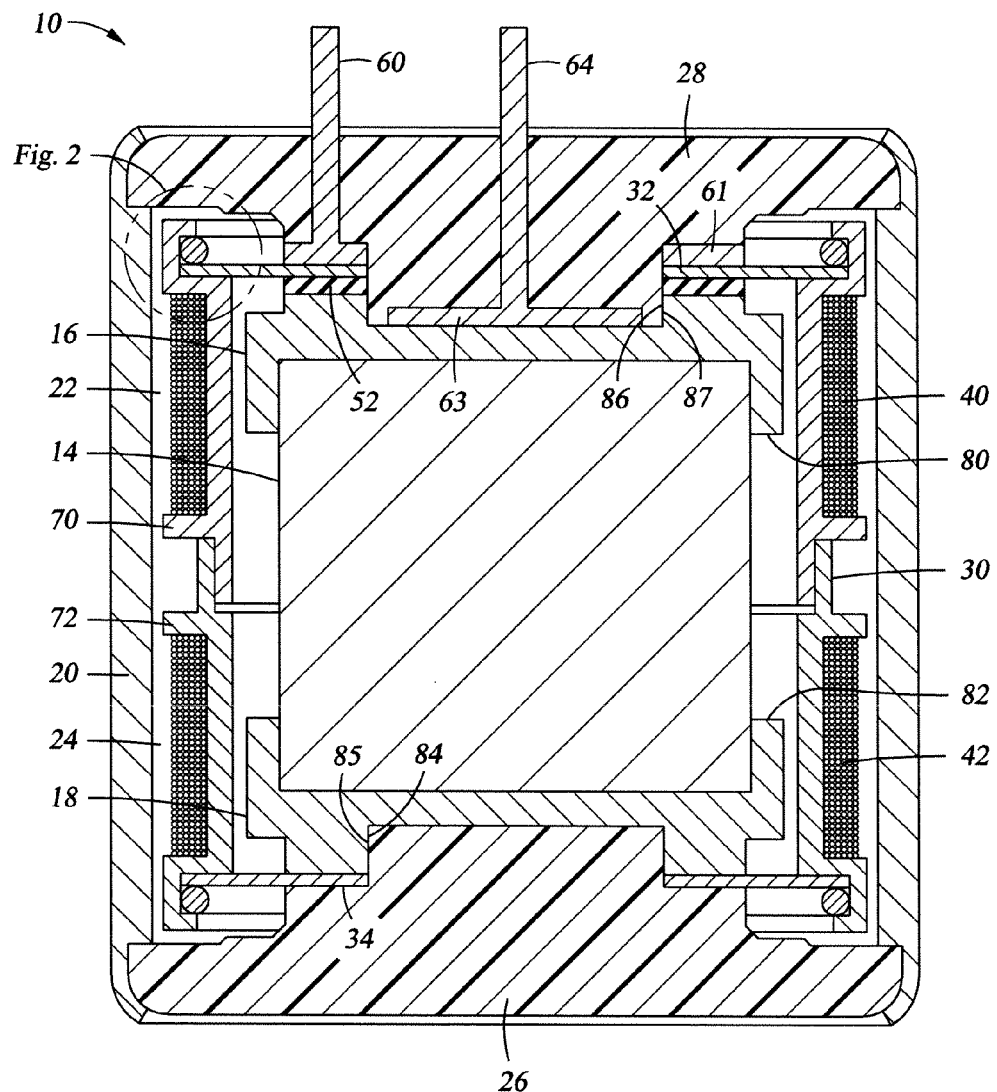
FIG. 1 is a cross-section side view of a typical vertical geophone assembly of prior art taken along the geophone longitudinal axis, showing a magnet, upper, lower pole pieces, an outer cylindrical housing, and a coil form assembly carrying upper and lower electrical coils that is suspended within the cylindrical housing between upper and lower springs.
Figure 4:
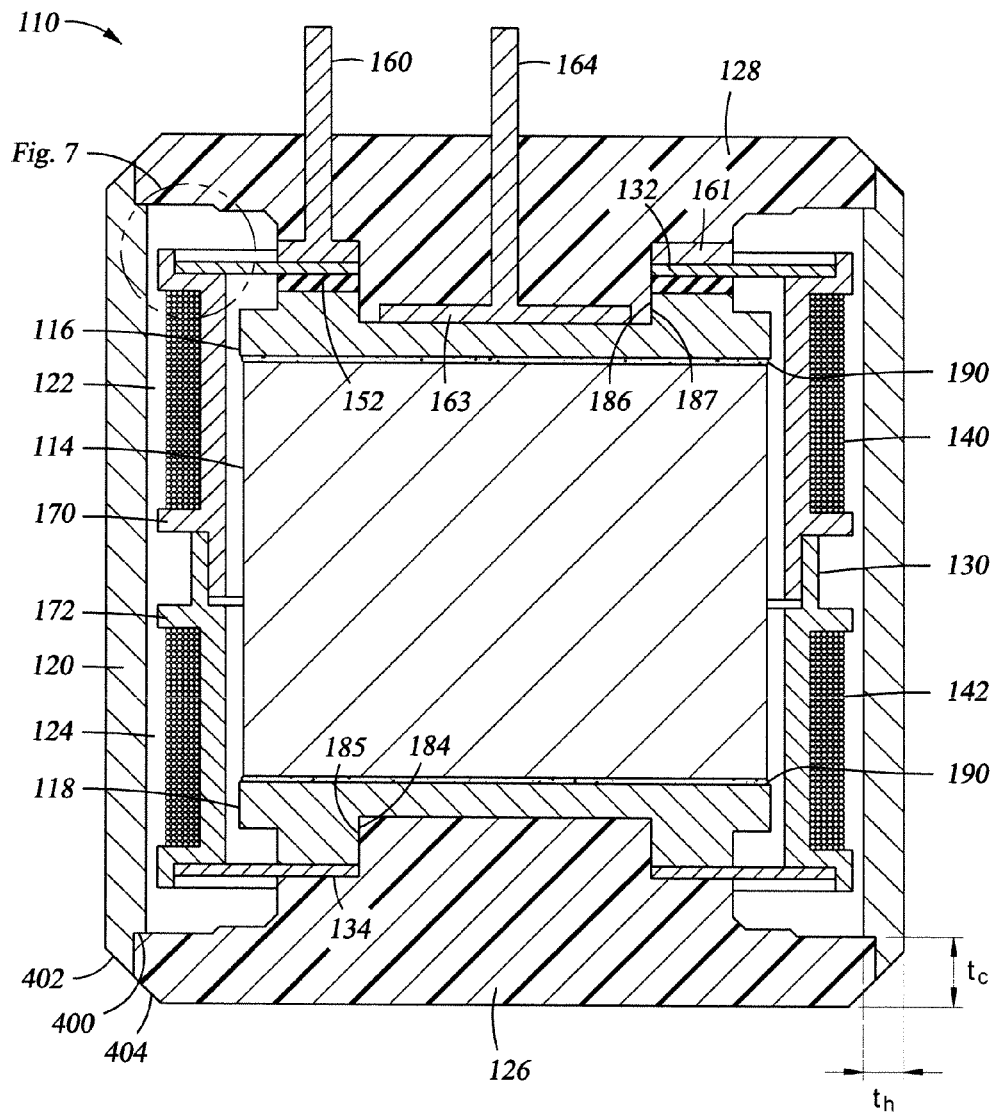
FIG. 4 is a cross-section side view of a vertical geophone assembly according to a first embodiment of the invention, showing lipless upper and lower pole pieces that have been connected to the magnet by electrically conductive adhesive bonds.

FIG. 4 illustrates an improved miniaturized geophone 110 according to a first embodiment of the invention in a cross section taken along the longitudinal axis. Like prior art geophone 10 of FIG. 1, geophone 110 includes a cylindrical magnet 114, cylindrical upper and lower pole ferrous pole pieces 116, 118, and a tubular ferrous outer housing 120 that form a magnetic circuit including upper and lower annular air gaps 122, 124.

However, unlike the prior art pole pieces 16, 18, pole pieces 116, 118 are lipless. That is, each pole piece 116, 118 abuts an end of magnet 114 but does not extend out around the side of magnet 114. By eliminating pole piece lips that encircle the circumference of magnet 114, the diameters of coil form 130 and housing 120 can be reduced, thereby allowing a reduced geophone diameter for a given magnet diameter.

Because the pole pieces are lipless, in a preferred embodiment, pole pieces 116, 118 are fastened to magnet 114 with an adhesive to keep magnet 114 coaxially aligned. Ideally, a thermoset adhesive such as a one-part or two-part epoxy is used. Dymax,® Loctite,® and Aremco brand epoxy adhesives, among others, may be suitable for fastening pole pieces 116, 118 to magnet 114.

Lower pole piece 118 and the lower end of outer housing 120 are connected to a lower end cap 126, and upper pole piece 116 and the upper end of outer housing 120 are connected to an upper end cap 128. The end caps 126, 128 are formed of an electrically non-conductive plastic material.

The bottom end of lower pole piece 118 includes a centered circular recess 184 that mates with a centered circular protrusion 185 formed on the upper side of lower end cap 126, thereby precisely coaxially aligning lower pole piece 118 with lower end cap 126. Alternatively (not illustrated), lower pole piece 118 may have a circular protrusion that is received into a circular recess formed in lower end cap 126. A similar arrangement of a circular recess 186 and a circular protrusion 187 keeps upper pole piece 116 coaxially aligned with upper end cap 128.

A cylindrical coil form 130 is suspended between an upper frequency-tuned spring 132 and a lower frequency-tuned spring 134 within the annular space between magnet 114 and housing 120. The frequency-tuned springs 132, 134 allow magnet 114, pole pieces 116, 18, and outer housing 120 to vibrate up and down axially with respect to the coil form 130 while the coil form 130 remains essentially motionless and decoupled from the rest of the geophone 110.

The upper and lower frequency-tuned springs 132, 134 are ideally washer-shaped and are seated about protrusions 187, 185 of upper and lower end caps 128, 126, respectively, thereby coaxially centering frequency-tuned springs 132, 134 and coil form 130. The inner circumferences of frequency-tuned springs 132, 134 are sandwiched between respective end caps 128, 126 and pole pieces 116, 118. The outer circumferences of the frequency-tuned springs 132, 134 are connected to the upper and lower ends of the coil form 130 as described in greater detail below with respect to FIGS. 6 and 7.

Upper and lower electrical coils 140, 142 are wound about the coil form 130 so as to be located in the upper and lower air gaps 122, 124, respectively. The winding direction of the upper coil 140 is opposite of the winding direction of the lower coil 142, and the coils are electrically connected together in series.

The upper lead (not visible) of upper coil 140 is electrically connected to the outer circumference of upper frequency-tuned spring 132 by a solder joint, for example. The inner circumference of upper frequency-tuned spring 132 makes sliding electrical contact with an outer wiper ring assembly 161, which includes a lead 160 that passes through upper end cap 128. The inner circumference of upper frequency-tuned spring 132 is separated and electrically isolated from upper pole piece 116 by a thin dielectric washer 152 that is positioned therebetween.

The lower lead (not visible) of lower coil 142 is connected to the outer circumference of lower frequency-tuned spring 134 by a solder joint, for example. The inner circumference of lower frequency-tuned spring 134 makes sliding electrical contact with the lower surface of lower pole piece 118. An electrical connection is formed between lower pole piece 118 and upper pole piece 116 through electrically-conductive adhesive epoxy 190 that cements the upper and the lower pole pieces to magnet 114. If necessary, adhesive epoxy 190 may be made suitably electrically conductive by the addition of silver or nickel fillers, for example. Finally, upper pole piece 116 makes sliding electrical contact with an inner wiper surface 163, which includes a lead 164 that passes through upper end cap 128.

Figure 3:
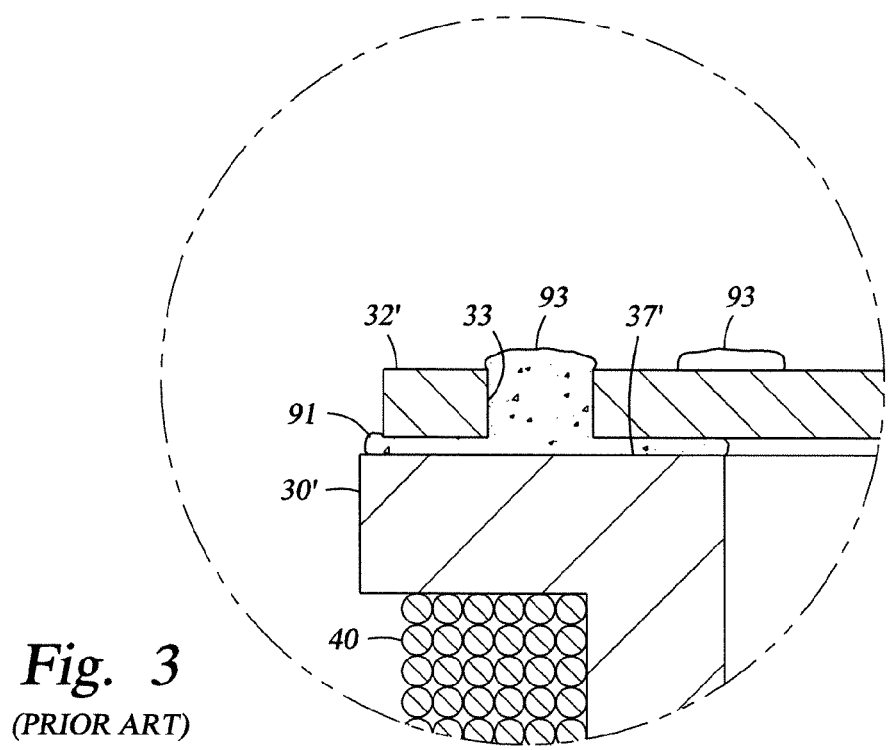
Figure 5:
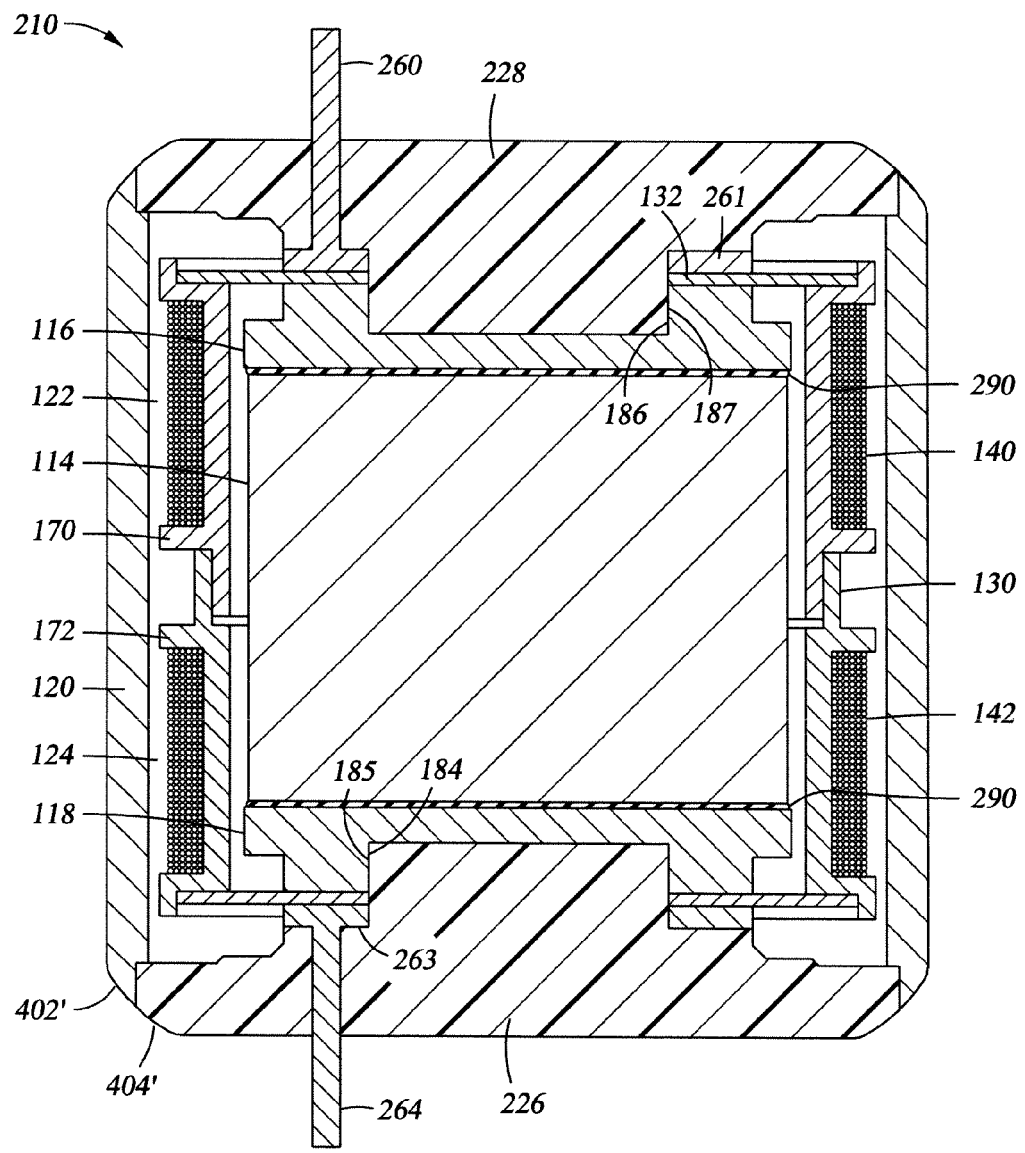
FIG. 5 is a cross-section side view of a vertical geophone assembly according to a second embodiment of the invention, showing lipless upper and lower pole pieces that have been connected to the magnet by electrically insulative adhesive bonds.

FIG. 5 illustrates an improved miniaturized geophone 210 according to a second embodiment of the invention in a cross section taken along the longitudinal axis. Like geophone 110 of FIG. 3, geophone 210 includes lipless pole pieces 116, 118 that are bonded to magnet 114 with an epoxy or like thermosetting adhesive. However, rather than using an electrically conductive adhesive 190, an adhesive 290 with dielectric properties is used. If necessary, adhesive epoxy 290 may be made suitably electrically non-conductive by the addition of mica fillers such as borosilicate glass micro-spheres, for example. Other insulating fillers may also be used as appropriate.

The upper lead (not visible) of upper coil 140 is electrically connected to the outer circumference of upper frequency-tuned spring 132 by a solder joint, for example. The inner circumference of upper frequency-tuned spring 132 makes sliding electrical contact with an upper wiper ring assembly 261, which includes a lead 260 that passes through upper end cap 228. The inner circumference of upper frequency-tuned spring 132 is separated and electrically isolated from magnet 114 by dielectric adhesive 290.

The lower lead (not visible) of lower coil 142 is connected to the outer circumference of lower frequency-tuned spring 134 by a solder joint, for example. The inner circumference of lower frequency-tuned spring 134 makes sliding electrical contact with a lower wiper ring assembly 263, which includes a lead 264 that passes through lower end cap 226. The inner circumference of lower frequency-tuned spring 134 is separated and electrically isolated from magnet 114 by dielectric adhesive 290.

Figure 2:
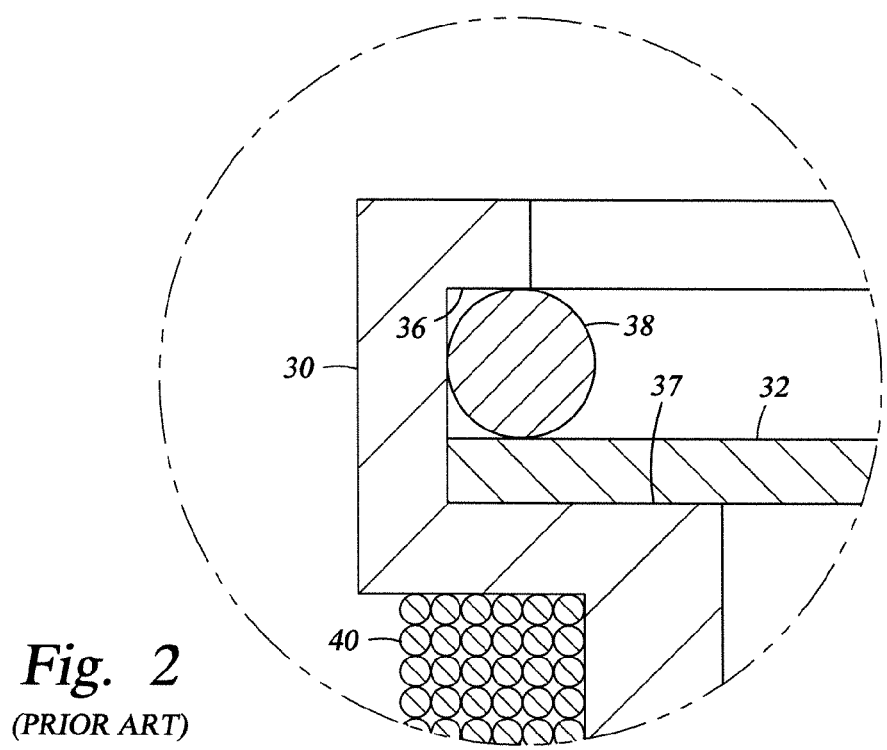
FIG. 2 is an enlarged side view in cross-section of a portion of the prior art geophone of FIG. 1 showing the arrangement for mounting the frequency-tuned springs to the coil form.
Figure 6:
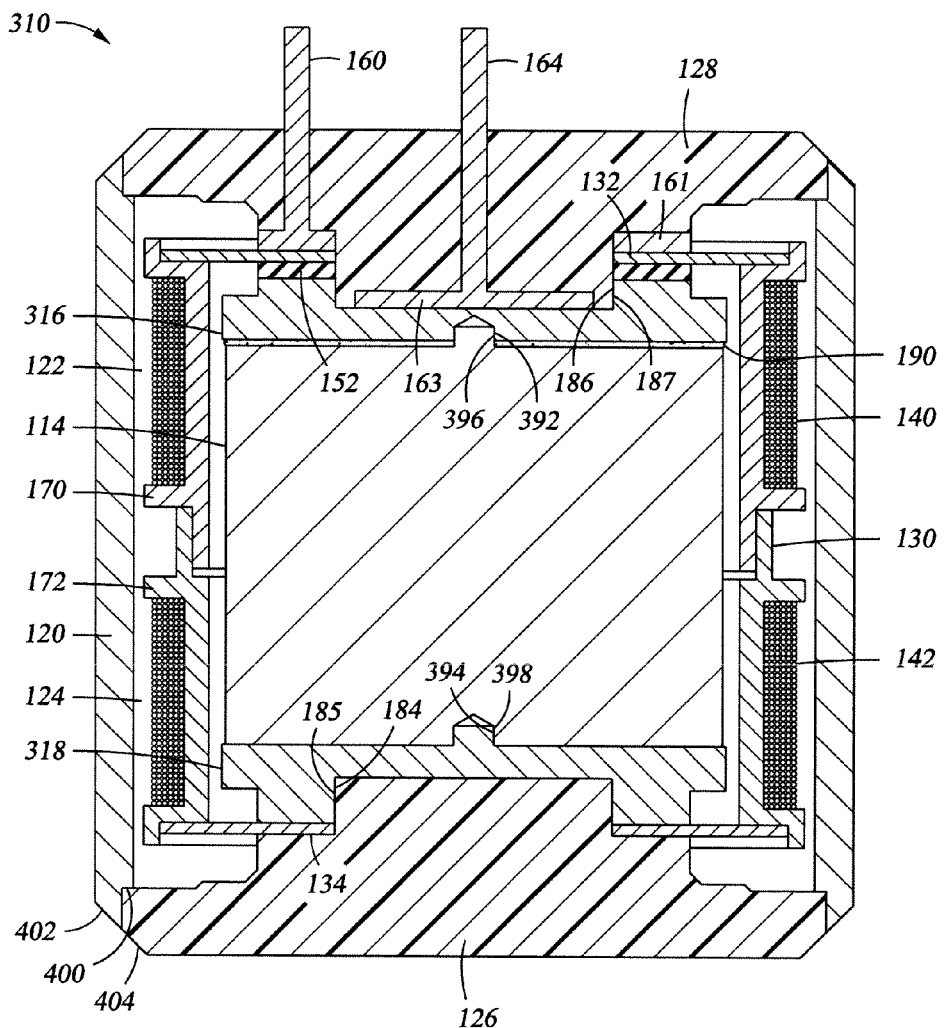
FIG. 6 is a cross-section side view of a vertical geophone assembly according to an alternate embodiment of the invention, showing a magnet that maintains axial alignment between lipless upper and lower pole pieces using magnet end profiles.

FIG. 6 illustrates a geophone 310 that includes a magnet 314 having ends that are formed with a coaxial-aligning profile. For example, the ends of magnet 314 may include one or more protruding nipples 392 or recessed dimples 394. Pole pieces 316, 318 include complimentary recessed dimples 396 or raised nipples 398 that mesh with the magnet profile to keep magnet 314 axially centered between pole pieces 316, 318. Like lips 80, 82 of prior art geophone 10 of FIG. 2, the coaxial-aligning profile at the ends of magnet 314 profile provides for mechanically maintaining coaxial alignment between the magnet and pole pieces without the use of an adhesive. Such a configuration is illustrated at interface of the magnet 314 and lower pole piece 318. A coaxial-aligning profile at the ends of magnet 314 may also be used in conjunction with an adhesive bond 190, as illustrated at interface of the magnet 314 and upper pole piece 316. That is, the coaxial-aligning profile at the ends of magnet 314 may be used either as an alternative to, or in addition to, adhesive bonding of the magnet to the pole pieces.

In addition to economizing radial space by eliminating pole piece lips, according to one or more embodiments of the invention, axial space is also economized by a novel coil form mounting arrangement. As described above with respect to FIGS. 1 and 2, the coil form 30 of prior art geophone 10 is mounted to frequency-tuned springs 32, 24 using retaining rings, C-rings, C-clips, or like clamps or 38 that are compressed and inserted into interior circumferential grooves 36 formed in the upper and lower ends of coil form 30. Such an arrangement incurs a height penalty along the vertical dimension in order to accommodate clamps 38.

Figure 7:
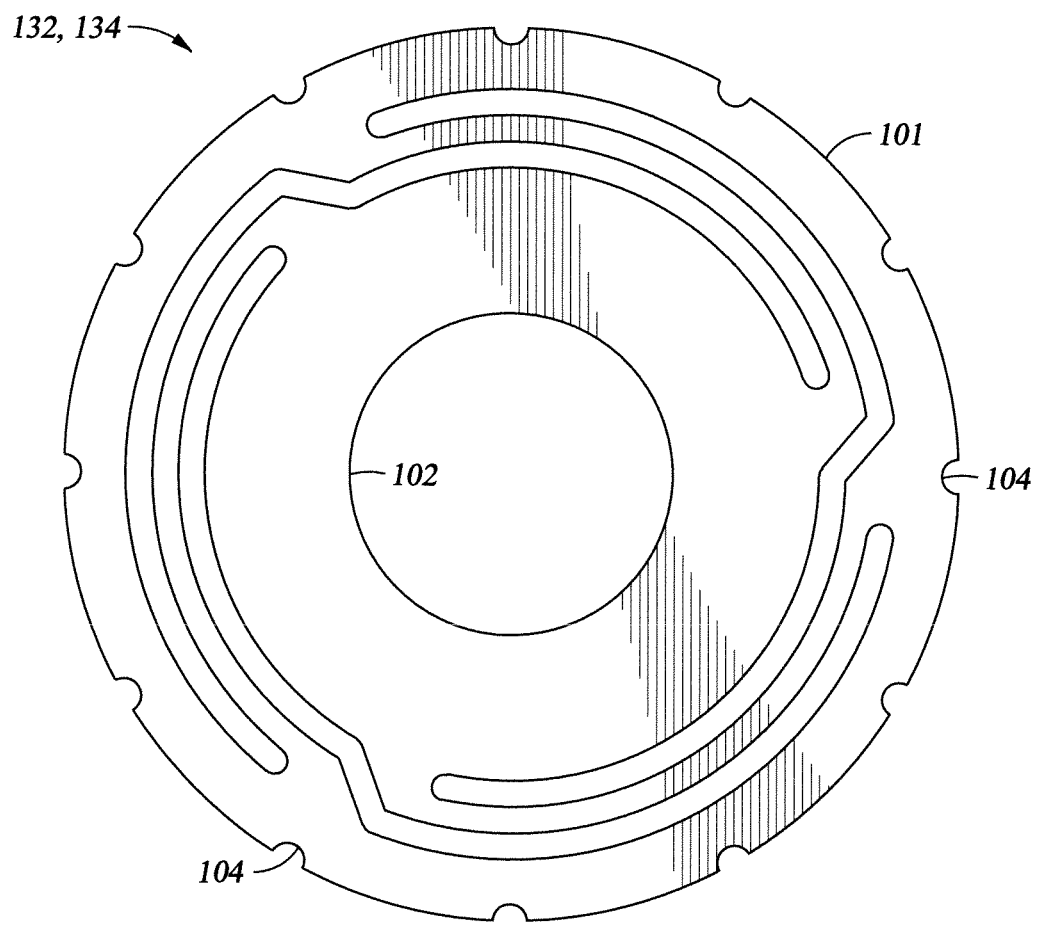
FIG. 7 is a plan view of a frequency-tuned spring of FIG. 4 according to a preferred embodiment of the invention.
Figure 8:
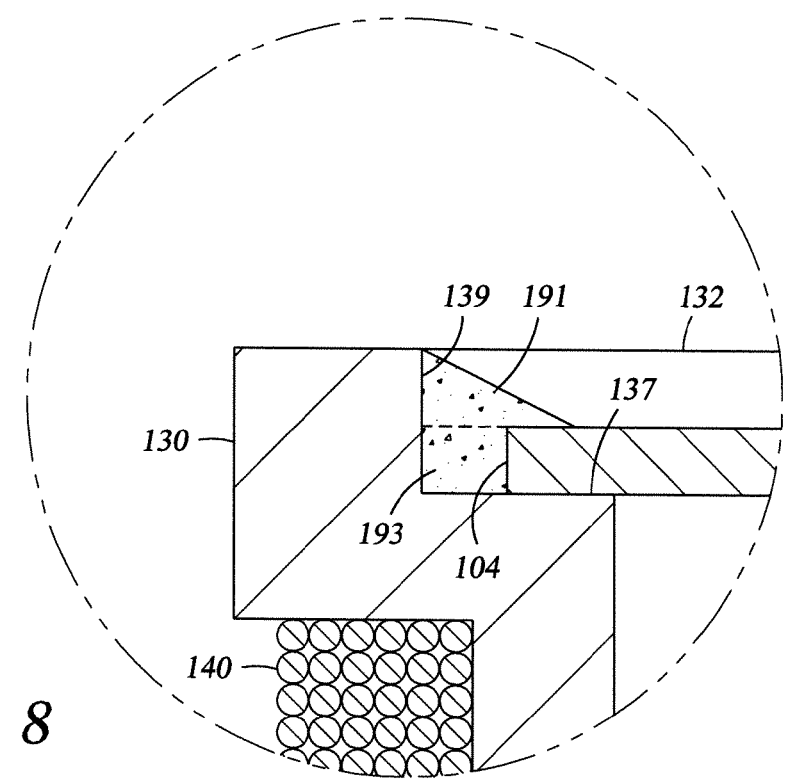
FIG. 8 is an enlarged side view in cross-section of a portion of the geophone of FIG. 2, showing an improved arrangement for mounting the frequency-tuned springs to the coil form according to a preferred embodiment of the invention.

However, as illustrated in FIGS. 4, 7, and 8, frequency-tuned springs 132, 134 are seated directly against recessed shoulders 137 of coil form 130. The outer diameter 101 of springs 132, 134 fit precisely within the interior lip surface 139 so as to be self-centering with respect to the coil form 130. Each spring 132, 134 is affixed to coil form 130 by an adhesive bead or fillet 191 disposed around the circumference on the outward-facing surface of the spring. There is no adhesive between spring 132, 134 and shoulder 137. Use of an adhesive allows the C-ring clamp 38 and interior circumferential groove 36 to be eliminated thereby allowing the axial dimension of coil form 130 to be shortened. Ideally, a thermoset adhesive such as a one-part or two-part epoxy is used. Dymax,® Loctite,® and Aremco brand epoxy adhesives, among others, may be suitable for fastening frequency-tuned springs 132, 134 to coil form 130.

In a preferred embodiment, frequency-tuned springs 132, 134 are thin, planar, washer-shaped metallic disks, defining an outer circumference 101 and having a central opening defining an inner circumference 102. One or more elongate slots 103 are formed in each frequency-tuned spring 132, 134 to allow the outer circumference 101 to distend axially a distance from inner circumference 102. The shape and arrangement of slots 103 is designed and tuned to provide a desired resonant frequency.

Frequency-tuned springs 132, 134 ideally include a number of notches, cut-outs or indentations 104 intervaled about their outer circumference 101. Notches 104 allow uncured adhesive to flow and collect therein. Once cured, strong, hard and rigid epoxy columns 193 and circumferential fillet mechanically surround and capture frequency-tuned springs 132, 134 within coil form 130. Because epoxies have high cohesive strength, columns 193 ensure a robust mechanical connection without adhesive bonding between coil form shoulder 137 and frequency-tuned springs 132, 134.

As the geophone is miniaturized, the lower inertia of the smaller lighter coil form shifts the natural frequency response towards higher frequencies and diminishes geophone sensitivity in the lower frequencies of interest to the geophysical exploration field (typically 30 Hertz or lower). To compensate, the frequency-tuned springs are made thinner. At a certain scale, however, manufacturing and material limitations prevent making the frequency-tuned springs any thinner. Further mass reduction of the coil form beyond this point may result in a geophone unsuitable for its intended use. Accordingly, it is desirable to exert greater control over the mass of the coil form so that the miniaturized coil form can be made selectively heavier.

According to a preferred embodiment, geophone 110 employs a two-piece bimetallic coil form 130, in which a first bobbin sleeve 170 is formed of anodized aluminum and a second bobbin sleeve 172 is formed of a heavier material, such as brass, bronze, or copper, for example. The anodization electrically insulates the aluminum bobbin sleeve 170, for suppression of eddy currents as described above. The use of brass, bronze, or copper, for the second bobbin sleeve 172 raises the overall mass of coil form 130 to lower frequency response without becoming too heavy so as to over damp.

Upper bobbin sleeve 170 is received into lower bobbin sleeve 172 (or vice versa). Upper and lower bobbin sleeves 170, 72 are joined by adhesive.

Figure 9:
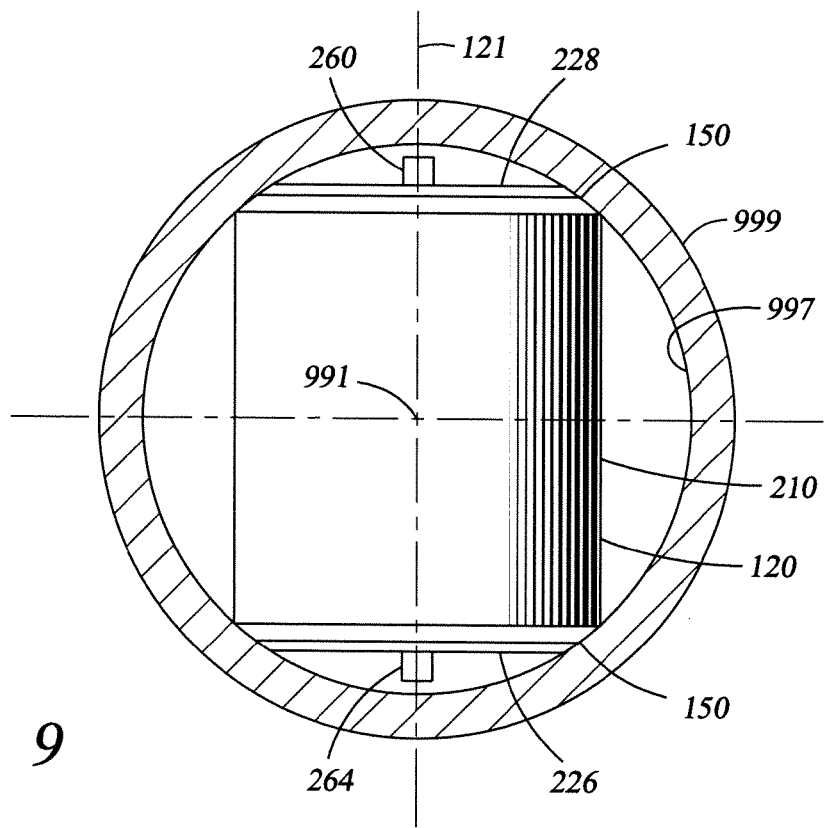
FIG. 9 is a cross-section side view of a marine streamer or similar cable with the vertical geophone assembly of FIG. 5 disposed therein so that the geophone axis is orthogonal to the cable axis.

As illustrated in FIG. 9, another feature of micro-geophone 210 according to one or more embodiments of the invention is the unique housing assembly arrangement that provides for maximizing geophone length and/or diameter dimensions when the geophone 210 is located within a streamer body or similar cylindrical body 999 and oriented with the geophone axis 121 perpendicular to the streamer axis 991. Prior art geophone housings such as geophone 10 of FIG. 1 that crimp or swedge housing 20 about the circumference of end caps 26, 28 in order to affix the end caps to the housing, which consumes valuable space that could otherwise be used to increase magnet size. Micro-geophone 210, on the other hand, employs a geometry that allows a maximum bevel or chamfer 150 to cut away from the cylindrical housing 120 and end caps, which allows the overall geophone dimensions to be maximized for s given inner diameter 997 of streamer 999.

Referring to FIG. 4, a seat 400 is formed around the interior circumference of cylindrical housing 120 at each of the top and bottom ends. Upper and lower end caps 128, 126 each have an outer diameter so that they fit snuggly within seats 400. The end caps 128, 126 are affixed to housing 120 by use of an adhesive bonding agent. The end caps 128, 126 each have a chamfer 404, which in a preferred embodiment may extend across greater than 30 percent, or even 50 percent or more of the nominal thickness $t_c$ of the end caps around their perimeter. Similarly, the housing has a chamfer 402 at each of its upper and lower ends, which in a preferred embodiment may extend across greater than 30 percent, or even 50 percent or more of the nominal thickness $t_h$ of the housing at its upper and lower ends. The chamfers 402 and 404 are preferably aligned to define a singular chamfer profile 150 (FIG. 9) that generally matches the angle of and abuts the inside circumference of streamer 999.

In FIG. 4, chamfer 402 and 404 define a profile with a flat surface. In an alternative embodiment, chamfers 402' and 404' define a profile with a rounded surface with a radius that matches the inside circumference of streamer 999.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A geophone (110) comprising:
   a magnet (114) having an upper end and a lower end, said magnet characterized by a magnet width;
   a pole piece (116) secured to said upper end of said magnet (114), said pole piece having substantially the same width as said magnet width, with no pole piece lip extending downwardly from said pole piece (116), said pole piece (116) being conductively bonded to said upper end of said magnet;
   a tubular coil form (130) disposed around said magnet (114) and said pole piece, said coil form (130) having a first recess formed at a first end of said coil form so as to define a first shoulder (137) bounded by a first circumferential lip (139);
   a generally planar first spring (132) defining first and second obverse faces, a perimeter portion of said first face of said first spring directly adjoining said first shoulder (137), an interior portion of said first spring (132) coupled to said magnet (114) via said pole piece (116) so that said perimeter portion of said first face of said first spring is axially movable with respect to said magnet (114);
   a first adhesive fillet disposed between a perimeter portion of said second face of said first spring (132) and said first circumferential lip (139) so as to bond said first spring (132) to said coil form (130); and
   a coil (140, 142) wound about said coil form (130).

2. The geophone (110) of claim 1 further comprising:
   a pole piece (118) secured to said bottom end of said magnet (114), said pole piece (118) having substantially the same width as said magnet width, with no pole piece lip extending upwardly from said pole piece (118), said pole piece (118) being conductively bonded to said bottom end of said magnet (114); and
   a second recess formed at a second end of said coil form (130) so as to define a shoulder (137) bounded by a circumferential lip (139);
   a generally planar second spring (134) defining first and second obverse faces, a perimeter portion of said first face of said second spring directly adjoining said second shoulder, with an interior portion of said second spring coupled (134) to said magnet (114) so that said perimeter portion of said first face of said second spring is axially movable with respect to said magnet; and
   a second adhesive fillet disposed between a perimeter portion of said second face of said second spring and said second circumferential lip (139) so as to bond said second spring to said coil form.

3. The geophone (110) of claim 1 further comprising:
   a notch (104) formed at the circumference of said first spring (132); and
   an adhesive column (193) formed in said notch (104) and bonded to said shoulder (137).

4. The geophone (110) of claim 1 wherein:
   said coil form (130) is bimetallic.

5. A geophone coil form assembly comprising:
   a tubular first bobbin (170) having first and second ends and a recess formed at said first end of said first bobbin so as to define a first shoulder (137) bounded by a first circumferential lip (139);
   a generally planar first spring (132) defining first and second obverse faces seated within said recess of said first bobbin (170) with said first face directly adjoining said first shoulder;
   a first adhesive bead disposed between said second face of said first spring and (132) said first circumferential lip (139) so as to bond said first spring to said first bobbin (170);
   a first coil (140) wound about said first bobbin (170); and a tubular second bobbin (172) having first and second ends and a recess formed at said first end of said second bobbin so as to define a second shoulder (137) bounded by a second circumferential lip (139), said second end of said second bobbin coupled to said second end of said first bobbin (170);
   a generally planar second spring (134) defining first and second obverse faces seated within said recess of said second bobbin with said first face of said second spring (134) directly adjoining said second shoulder;
   a second adhesive bead disposed between said second face of said second spring (134) and said second circumferential lip (139) so as to bond said second spring (134) to said second bobbin (172); and a second coil (140) wound about said second bobbin, wherein said first bobbin (170) is formed of a first material; and said second bobbin (172) is formed of a second material having greater density than said first material.

6. The geophone coil form assembly of claim 5 wherein:

said first bobbin (170) is formed of aluminum; and said second bobbin (172) is formed of one of the group consisting of brass, bronze, and copper.

7. The geophone coil form assembly of claim 5 wherein:

said first bobbin (170) is anodized aluminum, and said first bobbin (170) is adhesively bonded to said second bobbin (172).

8. A geophone (110) comprising, a magnet (114) having a top end and a lower end, said magnet (114) characterized by a magnet width;

a pole piece (116) secured to said top end of said magnet (114), said pole piece having substantially the same width as said magnet width, with no pole piece lip extending downwardly from said pole piece (116), said pole piece (116) being conductively bonded to said top end of said magnet;

a tubular coil form (130) disposed around said magnet and said pole piece (116);

a generally planer first spring (132) having an interior portion which is coupled to said magnet (114) via said pole piece (116) so that said perimeter portion of said first face of said spring is exactly moveable with respect to said magnet (114); and coils (140, 142) wound about said coil form (130).

\* \* \* \* \*